Aug. 25, 1959 W. M. KAUFFMANN 2,900,968
INTERNAL COMBUSTION ENGINE
Filed March 25, 1958 2 Sheets-Sheet 1

WILLIAM M. KAUFFMANN
INVENTOR.

BY
ATTY

Aug. 25, 1959  W. M. KAUFFMANN  2,900,968
INTERNAL COMBUSTION ENGINE
Filed March 25, 1958  2 Sheets-Sheet 2

WILLIAM M. KAUFFMANN
INVENTOR.

BY Daniel A. Bobis
atty

United States Patent Office 2,900,968
Patented Aug. 25, 1959

2,900,968

INTERNAL COMBUSTION ENGINE

William M. Kauffmann, Hamburg N.Y., assignor to Worthington Corporation, Harrison, N.J., a corporation of Delaware Application March 25, 1958, Serial No. 723,724

2 Claims. (Cl. 123—120)

This invention relates to internal combustion engines and aims to provide for more efficient operation of such engines by providing, among other features, actuating means for the fuel injection means which are operable from the main inlet valve.

In order to exhaust the burnt gases completely from the engine cylinder means are usually associated with the foregoing engine that effectively impart a high initial velocity to the entering air which in effect leaves the cylinder substantially free of exhaust gases.

In addition, provisions are made for the admission of fuel into the passageway providing scavenging air and leading to the engine cylinder while the main inlet valve is opened. It often occurs that such fuel is admitted while the exhaust is opened and therefore flows out of the cylinder with the exhausted gases to cause a substantial waste of the injected fuel.

In Patent 2,764,963 applicant has described and claimed a system which precludes the waste outlined hereinabove by precluding the admission of fuel into the cylinder until the exhaust valve associated therewith is completely closed.

The fuel injection system contemplated herein and for accomplishing the foregoing result includes a gas injection valve disposed in an intake passageway so positioned and proportioned to impart a high velocity to the air flowing therethrough and the gas injection valve is actuated by means associated with the main inlet valve and the foregoing means not only provides for the simultaneous movement of the gas injection valve on actuation of the main inlet valve but also reduces the valve mechanism inertia to a minimum.

Accordingly, it is one of the objects of this invention to provide a novel intake passageway that imparts a high initial velocity to the entering air whereby the burnt gases are completely exhausted from the engine to thereby add to the efficiency of the engine.

It is another object of this invention to provide actuating means for the gas injection valve and main inlet valve which substantially reduce the valve mechanism inertia.

It is a further object of this invention to provide means for the gas injection valve which direct the entering gas axially into the intake passageway and at a high velocity to thereby obtain a thorough air-gas mixture.

With these and other objects in view, as may appear from the accompanying specification, the invention consists of various features of construction and combination of parts, which will be first described in connection with the accompanying drawings, showing an internal combustion engine of a preferred form embodying the invention and the features forming the invention will be specifically pointed out in the claims.

Figure 1:
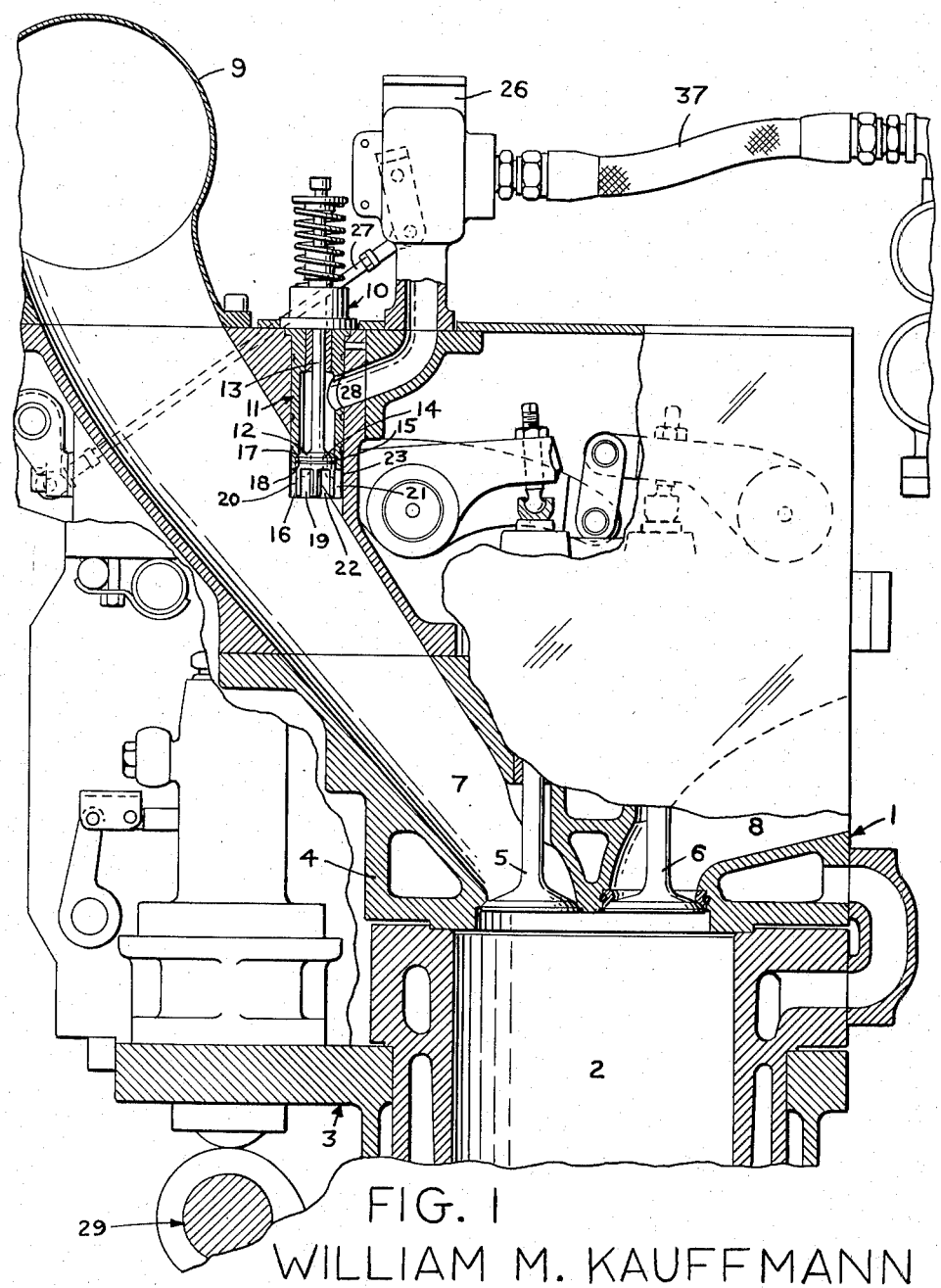
Figure 1 is an end view partly in section showing the intake passageway and fuel injection means for admitting fuel therein.

Referring now more particularly to the drawings the improved engine generally designated 1 is shown and includes a cylinder 2 mounted in a frame portion 3 and enclosed by a head portion 4.

The head 4 houses a pair of inlet and exhaust valves 5 and 6 with which the intake passage 7 and exhaust passage 8 communicate respectively.

The intake passage 7 has its inlet end opening into the intake manifold 9 to receive therefrom high pressure air from the usual turbo-charger (not shown). The intake passageway extends from the intake manifold 9 to the inlet valve 5 in an almost vertical direction, deviating therefrom only as much as is necessary by mechanical features of the engine construction. Said another way the intake passage 7 extends from the intake valve 5 to the manifold 9 at an acute angle to a vertical plane bisecting the axis of the cylinder 2 as is clearly shown in Figure 1 of the drawings. In addition, and as is clearly shown in Figure 1 of the drawings the cross-sectional area of the intake passage varies throughout its length to provide a tapered effect thereto as it approaches the inlet valve 5. This substantially vertical disposition and tapered construction has been found to impart a high initial velocity to the air flowing therethrough to therefore provide a cylinder substantially free of exhaust gases at the end of the scavenging period.

In addition and to provide for the admission of fuel to the cylinder 2 upon the opening of the main inlet valve 5, provisions are made for associating fuel injection means 10 with the intake passage as is clearly shown in Figure 1 of the drawings and described in my prior Patent 2,764,963.

The fuel injection means 10 is mounted in the head 4 and extends into the intake passage 7 and includes a housing 11 in which is disposed a slidable valve head or piston member 12 having a piston rod or stem 13 connected thereto.

Piston member 12 comprises a substantially cylindrical sleeve disc 14 having a piston ring 15 thereon for slidable movement within an annular member 16 formed on the end of the housing 11. The upper end of disc 14 has a cone-shaped rim 17 adapted to seat in a fluid-tight relationship against a corresponding cone-shaped portion 18 disposed on the upper inner surface of member 16 to prevent gas leakage therebetween when the valve is in a closed or seated position. The lower portion of the housing 11 is provided with a central bore 19 which is coextensive with member 16 so that in a closed position rim 17 is seated against portion 18 of member 16 while the disc is completely enclosed within the annular member.

In order to preclude the waste of fuel by escape thereof with the burnt gases of combustion, delaying means designated 20 are formed in the vicinity of the annular member 16 and take the form of a plurality of circumferentially spaced, longitudinally extending fingers 21 which are formed on the lower end of member 16 and extend into the intake passage in the head 4 and form slots 22 therebetween. To provide for the axial admission of gas into the intake passage 7 a tubing means 23 taking the form of a diffuser is pressed over the slots 21 whereby the gas is directed into the incoming air stream flowing from manifold 9 to cylinder 2 at a high velocity of impingement to thereby provide a thorough air-gas mixture which is highly desirable for high speed engine operation.

Figure 3:
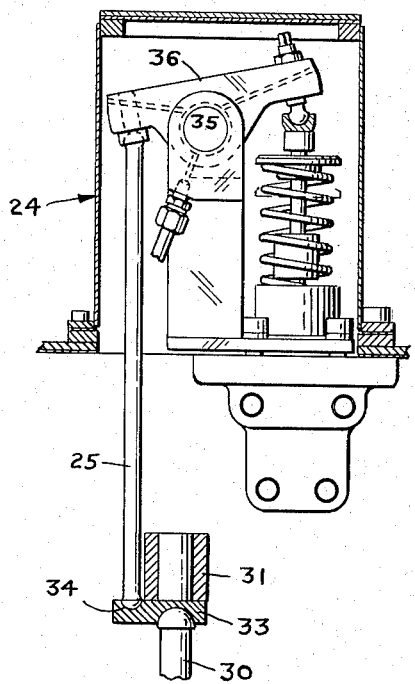
Figure 3 is a side view partly in section and taken in the vicinity of line 3—3 of Figure 2.
Figure 4:
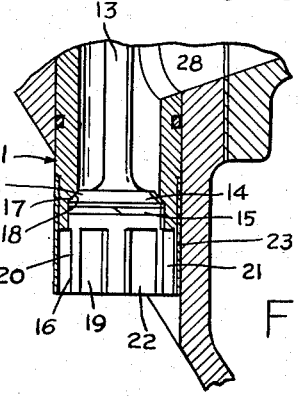
Figure 4 is an enlarged fragmentary section showing the portion of the fuel injection valve comprising the delaying means.

The upper end of the piston rod 13 extends above the housing 4 and is connected in a manner well known in the art to any type of means designated 24 which will accommodate a push rod 25 connected to means to be hereinafter described for actuating the fuel injection means 10 as is clearly shown in Figure 3.

A fuel supply conduit 37 communicating with a fuel source at one end passes through a metering system 26 which is preferably governor-operated by linkage means 27 and opens into the housing 11 at inlet opening 28.

Figure 2:
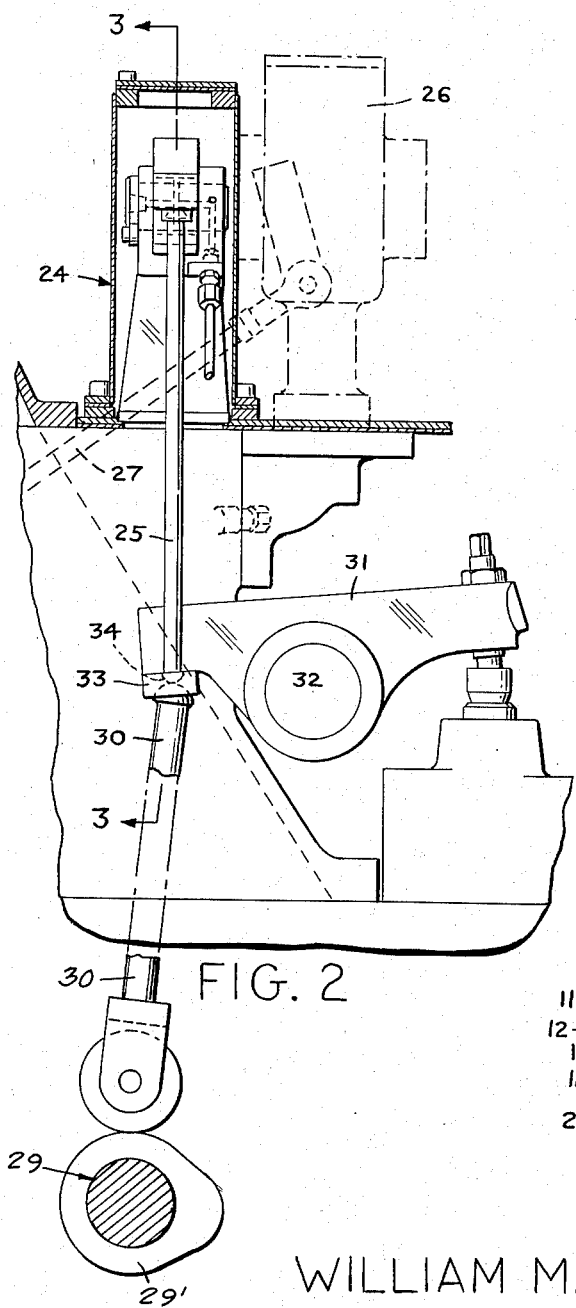
Figure 2 is a partial end view showing the novel means for simultaneously moving the fuel injection valve and the main inlet valve.

Novel means are fashioned as is hereinafter described to provide for the simultaneous movement of the main inlet valve 5 and the fuel injection means 10 and in addition to provide a system which effectively reduces the valve mechanism inertia to a practicable minimum; the said means being operable from the engine cam shaft 29 as shown in Figure 2 comprise a push rod or shaft 30 driven at one end by cam 29' and connected at the other end to one end of a lever 31 which is pivotably mounted on a shaft 32 and connected to the inlet valve 5 at the other end as is shown in Figure 2 of the drawings. Lever 31 is provided with a cross-bar yoke 33 having a cylindrical portion pressed into the lever 31 and for accommodating the push rod 30, and a flat portion machined with a cupped recess 34 which accommodates one end of push rod 25. The means 24 adapted to receive the other end of push rod 25 also takes the form of a lever 36 similar to lever 31 and is pivotably mounted on a shaft 35 and adapted to move the fuel injection means through action of the push rod 25 by the lever 31.

In the operation of the engine contemplated herein, and during the scavenging portion of the cycle, scavenging air flows through the inlet passageway and has a high velocity of flow induced thereto by the particular arrangement of the inlet passageway. The exhaust valve is then closed at approximately the proper time sequence by well known means operatively connected to the engine crankshaft. In the present invention, although the fuel injection means 10 and main inlet valve 5 are acted on simultaneously by the actuating means and both valves are moved toward an open position, the delivery of fuel to the inlet passageway will be delayed until after the exhaust valve is fully closed as the valve disc 14 disposed in annular member 16 will not permit fuel to pass therethrough until the valve disc slides downwardly in fingers 21 and until its lower end is adjacent the lower end of the fingers, which of course occurs after the exhaust valve has closed.

From the foregoing description it will be understood that the invention is not necessarily limited to the specific construction or arrangement of parts shown but that they may be widely modified within the invention defined by the claims.

What is claimed is:

1. In an internal combustion engine, a cam shaft, a cylinder including a head therefor, inlet means and exhaust means in said head and opening into said cylinder, an intake passageway passing through said head and opening on said inlet means, fuel injection means opening in said intake passageway, means connected to said cam shaft and for cooperatively and simultaneously actuating said inlet valve and said fuel injection valve, said last mentioned means comprising a shaft having a lever pivotably mounted thereon, said lever operatively connected to said inlet means at one end and operatively connected to said cam shaft at the other respective end, linkage means interconnecting said lever to said fuel injection valve, and delaying means on said fuel injection means including a tubing means mounted thereon for delaying the openings of said fuel injection means until said exhaust means is closed and said tubing means for causing axial admission of the fuel passing from the fuel injection means into the intake passageway.

2. The combination claimed in claim 1 wherein the intake passageway is disposed at an acute angle to the vertical axis of the mixing chamber and tapered to provide a high velocity flow to the air flowing therethrough.

References Cited in the file of this patent

UNITED STATES PATENTS

| 2,306,733 | Joslyn | Dec. 29, 1942 |
| 2,362,838 | Mallory | Nov. 14, 1944 |
| 2,729,205 | Nichols | Jan. 3, 1956 |
| 2,764,963 | Kauffmann | Oct. 2, 1956 |
| 2,832,324 | Barber | Apr. 29, 1958 |

FOREIGN PATENTS

| 444,722 | Germany | May 27, 1927 |